United States Patent [19]

Shimo et al.

[11] Patent Number: 4,855,181

[45] Date of Patent: Aug. 8, 1989

[54] LAMINATE WITH A BLEND LAYER OF POLYESTERAMIDE AND ETHYLENE-VINYL ACETATE COPOLYMER

[75] Inventors: Hiroyuki Shimo; Isao Kanesige, both of Kurashiki; Nobuo Tanaka, Nishinomiya, all of Japan

[73] Assignee: Kuraray Co., Ltd., Japan

[21] Appl. No.: 128,092

[22] Filed: Dec. 3, 1987

[30] Foreign Application Priority Data

Dec. 12, 1986 [JP] Japan ................... 61-297090

[51] Int. Cl.$^4$ .............. B32B 27/08; B32B 27/28
[52] U.S. Cl. ................... 428/336; 428/412; 428/475.2; 428/475.8; 428/476.3; 428/474.9; 428/518; 428/480
[58] Field of Search ............ 428/336, 412, 474.9, 428/475.2, 475.8, 476.3, 480, 518

[56] References Cited

U.S. PATENT DOCUMENTS

| | | |
|---|---|---|
| 4,481,238 | 11/1984 | Fagerburg et al. ............ 428/475.2 |
| 4,500,677 | 2/1985 | Maruhashi et al. ............ 525/57 |
| 4,559,266 | 12/1985 | Misasa et al. ............ 428/341 |
| 4,576,988 | 3/1986 | Tanaka et al. . |
| 4,608,286 | 8/1986 | Motoishi et al. . |
| 4,613,644 | 9/1986 | Moritani et al. . |
| 4,619,849 | 10/1986 | Anzawa et al. . |
| 4,636,551 | 1/1987 | Okaya et al. . |
| 4,640,870 | 2/1987 | Akazawa et al. . |
| 4,645,695 | 2/1987 | Negi et al. . |
| 4,684,564 | 8/1987 | Satch et al. . |

*Primary Examiner*—P. C. Ives
*Attorney, Agent, or Firm*—Kramer, Brufsky & Cifelli

[57] ABSTRACT

A laminated structure comprising a base material comprising polyvinyl chloride resin, polystyrene resin, polyacrylic resin, polycarbonate resin and polyamide resin; having provided on at least one surface thereof a layer of a blend of a polyesteramide and an EVOH. In this laminated structure the base material layer and the EVOH layer adhere firmly to each other, and the structure is exhibits excellent gas barrier properties, prevention of plasticizer bleeding and soil prevention, and is useful as wall paper, portfolio, desk mat, etc.

6 Claims, No Drawings

LAMINATE WITH A BLEND LAYER OF POLYESTERAMIDE AND ETHYLENE-VINYL ACETATE COPOLYMER

BACKGROUND OF THE INVENTION

1. Field of the Invention

This invention relates to a laminated structure comprising a base layer comprising a resin selected from the group consisting of polyvinyl chloride resin, polystyrene resin, polyacrylic resin, polycarbonate resin and polyamide resin; preferably polyvinyl chloride resin having provided on at least one surface thereof a layer of a blend of a polyesteramide, having a Tg (glass transition point) of not higher than 50° C., and a saponified product of ethylene-vinyl acetate copolymer (hereinafter referred to as EVOH).

2. Description of the Prior Art

Polyvinyl chloride a resin having markedly well-balanced characteristics among general-purpose resins, has been applied in a wide variety of end-uses. However, polyvinyl chloride alone can not satisfy all the requirements. For instance, when used for a container for foods or non-foods, high gas barrier properties are required where the contents are required to be free of oxidization or maintain their flavor. Further, wallpaper, artificial leather, etc. made of plasticized polyvinyl chloride exhibit the disadvantage of being easily soiled and difficult to be cleaned. It is known that for the purpose of overcoming the above-mentioned disadvantage an EVOH layer is provided on the outer surface of polyvinyl chloride to obtain a high gas barrier property, anti-bleeding property and resistance to oil.

Know methods of forming an EVOH layer on the outer surface of polyvinyl chloride include, laminating an EVOH film onto polyvinyl chloride (Japanese Utility Model Laid Open No. 172927/1984), applying EVOH solution onto polyvinyl chloride and drying off the solvent to form an EVOH coating layer (JPA No. 124661/1985). The solution coating method is advantageous since it can form a relatively thin coating, can easily form the coating on a base material of complicated shape, such as hollow containers, and can coat using relatively simple equipment.

When using the above-mentioned solution coating method to laminate an EVOH layer onto a polyvinyl chloride layer, unless an adhesive layer is provided as intermediate layer in between, the layers do not bond at all with each other. In most cases polyurethane adhesives are used for adhering the EVOH layer to a polyvinyl chloride layer. Generally, the polyurethane adhesive is first applied and then dried onto the base material of polyvinyl chloride, followed by application and drying of an EVOH solution thereon to give a laminated structure of EVOH and polyvinyl chloride. However, the process of applying and drying separately an adhesive solution and an EVOH solution makes the equipment complicated and, moreover, is economically unfavorable.

Thereupon, employment of a solution containing EVOH having mixed therewith an adhesive appears to be very useful, simplifying the application-drying process and also making unnecessary the solvent used with the adhesive solution. As a method for this, JPA No. 30600/1970 proposed incorporation of polyethyleneimine into an EVOH solution. However, this method practically does not, though firmly bonds polyolefin-related polymers, bond polyvinyl chloride.

Also, JPA No. 239233/1985 discloses a method comprising employment, as an inter-layer adhesive for polyvinyl chloride and EVOH, of a blend of a copolymer of vinyl chloride and vinyl acetate or acrylic acid ester with reactive polyurethane polymer. This method has a drawback in that it requires a separate process to apply the adhesive to the EVOH layer, and an additional drying time for the adhesive.

Further U.S. Pat. No. 4,459,400 (JPA No. 144330/1985) and U.S. Pat. No. 4,481,238 (JPA No. 501312/1985) disclose employment of polyesteramide as an inter-layer adhesive for adhering an EVOH layer and a PET layer but do not disclose any of the following facts:

polyesteramide exhibits good adhesiveness to polyvinyl chloride resin, polystyrene resin, polyacrylic resin, polycarbonate or polyamide resin, a layer of a blend of EVOH and polyesteramide is laminated with polyvinyl chloride layer, and thereby a laminated structure having an excellent peeling strength is obtained.

SUMMARY OF THE INVENTION

An object of the present invention is to provide, while eliminating the process of applying and drying an adhesive, a laminated structure in which one of aforementioned resins such as polyvinyl chloride, bonds firmly to EVOH.

The above object is achieved by providing a laminated structure comprising a base layer of one of aforementioned resin, such as polyvinyl chloride having provided at least on one surface thereof a layer of a blend of a polyesteramide, exhibiting a Tg (glass transition point) of not higher than 50° C., with a saponified product of ethylene-vinyl acetate copolymer in an weight ratio of from 5:95 to 35:65 (polyesteramide:EVOH).

Further, in the case where polyvinyl chloride is employed as a base material in the present invention, there can be obtained a polyvinyl chloride laminated structure which is excellent in gas barrier property, preventing plasticizers from bleeding and soil prevention.

DETAILED DESCRIPTION OF THE PREFERRED EMBODIMENTS

The polyesteramide used in this invention should have a Tg (glass transition point) of not higher than 50° C., preferably not higher than 40° C., most preferably not higher than 30° C. When the Tg is higher than 50° C., not only the compatibility of the polyesteramide with EVOH decreases, but also adhesion strength between polyvinyl chloride and EVOH decreases.

The polyesteramide as defined in this invention is a polymer composed of reaction product of a diamine component, diol component and dicarboxylic acid component, and which contains in a polymerization chain repeating ester units and repeating amide units. The diamine component comprises at least one kind of diamine having 2 to about 14 carbon atoms, preferably aliphatic diamines, but an aromatic diamine may be added thereto within a limit not to deviate from the intention of the present invention. Examples of suitable diamines include hexamethylenediamine, piperazine, 1-aminoethylpiperazine, bisaminopropylpiperazine, 1,3-dipiperazylpropane, 1,2-ethanediamine, mixtures thereof and the like. The diol component as used in this invention comprises at least one diol having 2 to about 24 carbon atoms, preferably aliphatic glycols having 2 to 12 carbon atoms. Examples of suitable diols include ethylene glycol, 1,4-butanediol, neopentyl glycol, 1,6-hexanediol, 1,4-cyclohexanedimethanol, mixtures thereof and the like.

The polyesteramide further contains a dicarboxylic acid component. The dicarboxylic acid component comprises at least one dicarboxylic acid having about 5 to about 14 carbon atoms, and is preferably an aliphatic dicarboxylic acid, but an aromatic dicarboxylic acid may be added within a limit not to deviate from the intention of the present invention. Examples of suitable dicarboxylic acids include sebacic acid, azelaic acid, adipic acid, mixtures thereof, and the like.

The polyesteramide of this invention can be synthesized by methods for producing polyestermides known by those skilled in the art. Generally, it is produced by normal melt-phase polymerization techniques from the diamine component, diol component and dicarboxylic acid component in the presence of a catalyst (preferably a titanium compound). Such method is disclosed, for instance, in JPA Nos. 144330/1985, 501312/1986. The polyesteramide used in this invention is a resin comprising in its polymer chain an ester component and an amide component in the molar ratio of 5:95 to 40:60, preferably 10:90 to 30:70. When the ester component is less than 5 mol %, the strength of adhesion to the polyvinyl chloride decreases, and when the ester component is more than 40 mol % the, compatibility with EVOH decreases.

The EVOH used in the present invention has an ethylene content of 20 to 60 mol %, preferably 25 to 55 mol %, and a saponification degree of vinyl acetate component of 90% or more, preferably 95% or more. When the ethylene content is lower than 20 mol %, the gas barrier properties at high humidities decrease or the water resistance decreases, while an ethylehe content of 60 mol % or higher does not result in sufficient gas barrier properties or causes a decrease in the capacity of preventing bleeding of plasticizer. And when the saponification degree is less than 90 % the gas barrier properties and the resistance to moisture decrease.

The EVOH may contain a comonomer unit, such as a small amount of an α-olefin such as propylene, isobutene, α-octene, and the like, unsaturated carboxylic acid or salt, partially alkylated ester, alkyl ester, nitrile and anhydride thereof, unsaturated sulfonic acid or salt thereof, and the like.

As regards the incorporation ratios of the polyesteramide and the EVOH, when the incorporation ratio of the polyesteramide is low the adhesion to polyvinyl chloride becomes low and a satisfactory composite structure can not be obtained. Whereas too high an incorporation ratio of the polyesteramide will cause a decrease in a gas barrier properties. Therefore, the polyesteramide should be incorporated relative, to the total weight of the polyesteramide and the EVOH, in an amount of 5 to 35% by weight, preferably 10 to 30% by weight.

A most effective method for providing a layer of the blend of the polyesteramide and the EVOH on at least one surface of a base material, comprises dissolving the polyesteramide and the EVOH in a common solvent and applying the solution. Here, as the common solvent, there are employed monohydric alcohols such as methyl alcohol, ethyl alcohol, propyl alcohol, butyl alcohol, and the like; dihydric alcohols such as ethylene glycol, propylene glycol, and the like; trihydric alcohols such as glycerine; phenols such as phenol and cresol; amines such as ethylene diamine and trimethylene diamine; acids such as formic acid, dimethyl sulfoxide, dimethyl acetamide, N-methyl pryolidone, and the like; or mixtures thereof with water, alone or in a combination of more two or more. Especially preferred solvents are mixed solvents of water-alcohol, for example, water-normal propyl alcohol, water-isopropyl alcohol, water-methyl alcohol, and the like.

Concerning the concentration of the solution of a mixture of the polyesteramide and the EVOH, any concentration may work for application but, usually a concentration of about 2 to about 20% by weight is preferred.

Any known methods are applicable for applying the solution of a mixture of the polyesteramide and the EVOH, including a roller coating method, spray coating method, dipping coating method, and the like. The polyvinyl chloride base material may be coated on one, two or all surfaces thereof.

After applying the solution of a mixture of the polyesteramide and the EVOH, drying is performed at a temperature of 30° to 200° C., preferably 50° to 150° C., for about 10 seconds to about 10 minutes. The drying of the coating film can be carried out until almost no volatile matter remains in the coating film. In order to prevent formation of cracks in the film, to maintain the transparency for a long period and to maintain the interlayer bonding strength of the film, it is advantageous to control the drying to a point where the volatile matter remains in the film in an amount of 0.5 to 5% by weight.

The thickness (after volatilizing the solvent) of the layer of the mixture of the polyesteramide and the EVOH applied on the polyvinyl chloride base material is in practice about 0.5 to about 20μ. When the thickness is less than 0.5μ, the film will not have sufficient gas barrier properties or exhibit sufficient prevention of plasticizer bleeding. On the other hand, when the thickness is more than 20μ, complex operations such as increasing the number of applications, is required to obtain a film of the required thickness, causing a serious problem of reduction in productivity.

The composite structure can also be formed using a hot pressing method or coextrusion method, instead of the solution coating method. For instance, the composite structure can be formed by hot pressing a melt-blend film of EVOH and polyesteramide and polyvinyl chloride film, or by coextruding a blend of EVOH with a polyesteramide with polyvinyl chloride.

The polyvinyl chloride used in the present invention include polyvinyl chloride and copolymers with a monomer copolymerizable with vinyl chloride such as vinyl acetate, acrylic acid ester, and the like. The polyvinyl chloride base material includes films sheets, hollow bottles, tubes, and the like.

In the present invention, improved properties are obtained by employing a blend of EVOH and polyesteramide laminated onto a film or sheet made of a plasticized polyvinyl chloride containing a plasticizer.

Most polyvinyl chlorides contain plasticizers and the content is usually in the range of from 25 to 55% by weight relative to the total weight. Plasticizers which are liquid at room temperature include phthalaterelated plasticizers such as dibutyl phthalate, di-2-ethylhexyl phthalate, diiso-octyl phthalate, diisodecyl phthalate, didecyl phthalate, di-nonyl phthalate, dilauryl phthalate, butyllaurul phthalate, butylbenzyl phthalate, and the like phosphates such as tricresyl phosphate, tributyl phosphate, tri-2-ethylhexyl phosphate, and the like. Chlorinecontaining plasticizers include chlorinated paraffine, and the like. Plasticizers which are solid at room temperature include phthalate-related plasticizers, such as dicyclohexyl phthalate, and phthalic acid diesters having not less than 13 carbon atoms in the alcohol component thereof, multivalent alcohols, such as aliphatic esters of dipentaerithritol; trimellitic acid-related plasticizers such as trioctyl trimellitate, and the like. EVOH having an ethylene content of 60% or below and a saponification degree of 09% or more, preferably 95% or more, shows resistance to the plasticizers, and resistance to migration and bleeding of the plasticizers. Of the plasticizer types listed above, the former (plasticizers being liquid at 20° C.) is the one having marked migration-bleeding characteristics, but the EVOH can prevent the marked migration-bleeding of the plasticizers of this type. Particularly the EVOH having an ethylene content of 55 mol % or below, preferably 50 mol % or below and not less than 25 mol % exhibits exceedingly satisfactory characteristics in the above prevention function and allows practically no plasticizer permeation.

As the ethylene content increases, the resistance to plasticizer permeation decreases gradually. When the content gets into the domain of 60 mol % or more, in the case where EVOH has been laminated onto a polyvinyl chloride sheet or film, the bleeding of plasticizer towards the surface becomes gradually noticeable and also the resistance to staining decreases. On the other hand, as the ethylene content decreases, the characteristics such as resistance to plasticizer permeation further increases. However in a domain where the ethylene content is less than 20 mol %, water resistance is low, which is not preferred because when the surface is cleaned with a wet cloth because of staining caused by external factors, not related with bleeding of a plasticizer, the wiped surface will swell, or be damaged.

The laminate of the present invention, wherein a blend of EVOH and polyesteramide is laminated with a plasticzercontaining polyvinyl chloride formed product (film, sheet, etc.) is preferably used for wall paper, desk mats, portfolios, polyvinyl chloride leather, films for agricultural use, and the like.

The laminate of the present invention can also be used for, packaging materials or containers for foods, beverages, chemicals, medicines, and so on. Further, after laminating or coating a blend of the EVOH and the polyesteramide onto a polyvinyl chloride base material, the thus obtained laminate can be formed by drawing and/or heat treatment, and the like into a desired formed product.

Further as occasion demands, a moisture-proof layer can be formed with a polyvinylidene chloride coat, vinyl chloride-vinyl acetate copolymer coat, and the like onto the EVOHpolyesteramide layer of the composite structure.

According to the present invention, there can be provided a firmly bonded laminated structure when the blend of EVOH and polyesteramide is laminated onto a base material of, besides polyvinyl chloride, polystyrene resin, polyacrylic resin, polycarbonate resin and polyamide resin.

While polystyrene resin, polyacrylic resin, polycarbonate resin and polyamide resin are superior in formability, they do not have sufficient gas barrier properties or resistance to oil. These drawbacks are minimized by laminating on such resin a blend of EVOH thereby polyesteramide, and the laminate will be useful as food packaging materials (materials such as containers, cups, film, etc.)

With regard to methods for laminating the blend of EVOH and polyesteramide onto a base matrial of such resins, the same methods as described hereinabove for polyvinyl chloride resin are applicable, but for polystyrene resin it is preferred that the base material be subjected to corona discharge treatment prior to the lamination.

Examples of polystyrene resin as used herein includes polystyrene and a copolymer (such as styrene-acylonitrile copolymer, styrene-p-divinylbenzene copolymer, styrene-butadiene copolymer, styrene-butadieneacrylonitrile copolymer, and the like) of styrene and a monomer copolymerizable therewith such as, acrylonitrile and butadiene. Preferred among them are a rubber-incorporated polystyrene which is known widely by those skilled in the art and which is prepared by conducting the polymerization of styrene in the presence of butadiene-styrene rubber; acrylonitrile-butadiene-styrene resin known widely as ABS by those skilled in the art; styrene-butadiene block copolymer having a high styrene component, which is known as a transparent, shock-resistant polystyrene; and so on.

Examples of polyacrylic resins are poly(acrylic acid ester) such as polymethylacrylate and polyethylacrylate; poly(methacryl acid ester) such as polymethylmethacrylate (PMMA), polyacrylonitrile, and the like, among which polymethylmethacrylate is preferred.

Polycarbonate resin as used in the present invention is a polymer in which a diol component is linearly bonded with each other intermediated by a carbonate bond. As the diol component, there are used 4,4'-dihydroxydiphenyl-1,1'-ethane, 4,4'-dihydroxydiphenyl-2,2'-propane, 4,4'-dihydroxydiphenylsulphone, and the like. These are obtained by known methods, such as subjecting a carbonate such as diphenylcarbonate to a transesterificationreaction in the presence or in the absence of catalyst followed by evacuation or reacting a carbonate with phosgene in the presence of an acid binder.

Examples of polyamides used in the present invention are 6-nylon, 66-nylon, 6,10-nylon, 11-nylon or derivatives thereof.

The invention will be explained in more detail by Examples and Comparative Examples below. In the Examples, % and parts mean those by weight unless otherwise indicated. Glass transition points (Tg) were measured by using PerkinElmer-DSC-2 Differential Scanning Calorimeter.

EXAMPLES

Examples 1 through 4

Ten parts of a blend of a polyesteramide consisting of azelaic acid/cyclohexane dimethanol/piperadine in a molar ratio of 0.50/0.09/0.41 and in a ester component/amide component ratio of 18/82 (Tg: 20.5° C.) with an EVOH containing 32 mol % of ethylene and having a saponification degree of 99.5% in an blending ratio by weight of 4:85, 10:90, 15:85, 20:80 each was added to 90 parts of a mixed solvent of 35% water and 65% n-propyl alcohol. The mixture was stirred for about 2 hours at a temperature of 70° to 80° C. to give four kinds of transparent solutions. These solutions were cooled to 25° C., and thereafter each applied onto a polyvinyl chloride film of 80 μ thick containing 33 parts of dioctyl phthalate (DOP) as a plasticizer using an applicator coating method, followed by drying at 70° C. for 10 minutes to form an EVOH coating film (film thickness: 5μ) containing about 3% of volatile matter.

Various properties of the thus obtained composite structures are shown in Table 1.

TABLE 1

|  | Blending Ratio of Polyester-amide (wt %) | Haze Degree (1) (%) | Oxygen Permeability (2) (EVOH Coating Layer) | T-Peel Strength (3) (g/15 mm width) | Migration of Plasticizer (4) (g/m²) |
|---|---|---|---|---|---|
| Example 1 | 5 | 6.3 | 2.8 | 20 | 0 |
| Example 2 | 10 | 6.3 | 3.2 | 80 | 0 |
| Example 3 | 15 | 7.2 | 3.8 | 330 | 0 |
| Example 4 | 20 | 8.2 | 4.2 | 550 | 0 |
| Comparative Example 1 | 2 | 5.6 | 2.4 | 5 | — |
| Comparative Example 1 | 40 | 19.9 | 23.0 | not peelable | — |

Notes:
(1) Apparatus: POIC Sphere Method Turbidimeter
Type and Supplier: SEP-HS-30D; Nippon Precision Optical Instrument Co., Ltd.
Haze degree of the base material: 5.9%
(2) Unit: cc/m² · day · atm (under 20° C., 65% RH)
Apparatus: OX-TRAN 10/50A; made by MODERN CONTROLS (The oxygen permeability of the composite structure was measured, and that of the polyvinyl chloride layer was subtracted from the former to give that of the EVOH coating layer only.)
(3) In order to reinforce the EVOH coating layer, an EVOH film (30μ thick) was laminated onto the EVOH coating layer by using a polyurethane adhesive. Then the T-peel strength between the EVOH coating layer and the polyvinyl chloride base film was measured at an extension rate of 250 mm/min..
(4) A plate (4 cm × 5 cm, 2 mm thick) of non-plasticized hard polyvinyl chloride was put in close contact with the EVOH coating layer of the composite structure. A weight of 10 kg was put on the hard polyvinyl chloride plate and the amount of plasticizer migrated to the hard polyvinyl chloride at a temperature of 70° C. after one week was measured.

EXAMPLE 5

Ten parts of a blend of a polyesteramide consisting of azelaic acid/ethylene glycol/piperadine in a molar ratio of 0.50/0.13/0.37 and in a ester component/amide component ratio of 26/74 (Tg: −2.3° C.) with an EVOH, containing 32 mol % of ethylene and having a saponification degree of 99.5%, in a blending ratio by weight of 15:85 was added to 09 parts of a mixed solvent of 30% water and 70% n-propyl alcohol. The mixture was stirred for about 2 hours at a temperature of 70° to 80° C. to give a transparent solution. The solution was cooled to 25° C., and thereafter applied onto a polyvinyl chloride film of 80 μ thick containing 33 parts of dioctyl phthalate (DOP) as a plasticizer using an applicator coating method, followed by drying at 80° C. for 5 minutes to form an EVOH coating film (film thickness: 2μ) containing about 1.5% of volatile matter.

The measurement of the transparency of the above-obtained composite structure showed a Haze degree of 6.8%, which is a good transparency for the specimen.

The oxygen permeability at 20° C., 65% RH of the composite structure was measured to give a value of 9.3 cc/m²·day·atm (the EVOH layer only).

Further the T-peel strength between the polyvinyl chloride and the EVOH coating film of the composite structure was 200 g/15 mm width.

EXAMPLE 6

Ten parts of a blend of apolyesteramide consisting of sebacic acid/neopentyl glycol/piperadine in a molar ratio of 0.50/0.05/0.45 and in a ester component/amide component ratio of 10/90 (Tg: 23.3° C.) with an EVOh containing 44 mol % of ethylene and having a saponification degree of 99.6% in an blending ratio by weight of 10:90 was added to 90 parts of a mixed solvent of 30% water and 70% n-propyl alcohol. The mixture was stirred for about 2 hours at a temperature of 70° to 80° C. to give a transparent solution. The solution was cooled to 25° C., and thereafter applied onto a polyvinyl chloride film of 80 μ thick containing 33 parts of dioctyl phthalate (DOP) as a plasticizer using an applicator coating method, followed by drying at 80° C. for 5 minutes to form an EVOH coating film (film thickness: 2μ) containing about 1.2% of volatile matter.

The measurement of the transparency of the above-obtained composite structure showed a Haze degree of 5.6%, which is a good transparency for the specimen.

The oxygen permeability at 20° C., 65% RH of the composite structure was 18.2 cc/m²·day ·atm (the EVOH layer only).

Further the T-peel strength between the polyvinyl chloride and the EVOH coating film of the composite structure was 60 g/15 mm width.

COMPARATIVE EXAMPLES 1 AND 2

The same experiments as in Examples 1 through 4 were repeated except that the blending ratios of the polyesteramide and the EVOH were 2:98 and 40:60 respectively. The properties of the thus obtained composite structures are also shown in Table 1.

In Comparative Example 1, although the Haze degree, which represents the transparency; and the oxygen permeability, which relates to the gas barrier property, were comparable with those of Examples 1 through 4, the T-peel strength, which indicates the bond strength, was far smaller than those of Examples 1 through 4, thus causing a problem in practical use.

In Comparative Example 2, while there was no problem with either the bond strength or the transparency, the gas barrier property was found to show a marked decrease.

EXAMPLE 7

Ten parts of a blend of a polyesteramide consisting of azelaic acid/cycolhexanedimethanol/piperadine in a molar ratio of 0.50/0.09/0.41 and in a ester component-/amide component ratio of 18/82 (Tg: 20.5° C.) with an EVOH containing 32 mol % of ethylene and having a saponification degree of 99.5% in an blending ratio by weight of 10:90 and 20:90 90 respectively was added separately to 90 parts of a mixed solvent of 35% water and 65% n-propyl alcohol. The mixtures were separately stirred for about 2 hours at a temperature of 70° to 80° C. to give two kinds of transparent solutions. The solutions were cooled to 25° C., and thereafter separately applied onto each of the following films:

polystyrene film (SRYROFILM, 50 $\mu$; ASAHI CHEMICAL),

POLYCARBONATE FILM (EUPIRON FILM, 100 $\mu$; MITSUBISHI GAS CHEMICAL),

PMMA sheet (KURALEX SHEET, 1000 $\mu$; NITTO RESIN INDUSTRIES), and 6-nylon film (EMBLEN, 15 $\mu$; UNTICA Corp.) by applicator coating method, followed using an drying at 80° C. for 10 minutes to form an EVOH coating film (film thickness: 5$\mu$) containing about 1.0% of volatile matter.

The measurements for the Haze degree and the oxygen permeability (20° C., 65% RH) of the above-obtained composite structures showed Haze degrees as good as those in Table 1.

The 180°-peel strengths between the base material and the EVOH coating layer of the above composite structures are shown in Table 2.

TABLE 2

| Base Material Resin | Corona discharge*** | 180°-Peel strengths (g/15 mm)* Blending ratio (wt %) | |
|---|---|---|---|
| | | 10 | 20 |
| Polystyrene | yes | 80 | 180 |
| Polycarbonate | no | 230 | ** |
| | yes | 450 | ** |
| PMMA | no | 120 | 200 |
| 6-nylon | yes | 100 | 180 |

*In order to reinforce the EVOH coating layer, an EVOH film (30$\mu$ thick) was laminated on the EVOH coating layer using a polyurethane adhesive. Then the 180°-peel strength between the EVOH coating layer and the base material was measured at an extension rate of 250 mm/min.
**not peelable
***Corona discharge output: 1 kw, treated at 20 m/min.

What is claimed is:

1. A laminated structure comprising a base layer of a resin selected from the group consisting of polyvinyl chloride resin, polystyrene resin, polyacrylic resin, polycarbonate resin and polyamide resin; having provided on at least one surface thereof, a layer of a blend of a polyesteramide, exhibiting a Tg (glass transition point) of not higher than 50° C., and a saponified product of ethylene vinyl acetate copolymer in a weight ratio between 5:95 to 35:65.

2. A laminated structure according to claim 1, wherein said polyesteramide comprises a repeating unit of at least one diamine component having 2 to 14 carbon atoms and a repeating unit of at least one dicarboxylic acid component having 5 to 14 carbon atoms, said polyesteramide comprising a molar ratio of the ester component and the amide component of from 5:95 to 40:60.

3. A laminated structure according to claim 1, wherein said saponified product of ethylene vinyl acetate copolymer has 20 to 60 mol % of ethylene and a saponification degree of the vinyl acetate component of not less than 90%.

4. A laminated structure according to claim 1, wherein the film thickness of said layer of a blend of a polyesteramide and a saponified product of ethylene-vinyl acetate is 0.5 to 20 $\mu$.

5. A laminated structure according to claim 1, wherein said polyvinyl chloride base material further comprises a plasticizer.

6. A laminated structure according to claim 1, wherein said layer of a blend of a polyesteramide and a saponified product of ethylene-vinyl acetate copolymer is formed by coating a solution of said blend of the polyesteramide and the saponified product of ethylene-vinyl acetate copolymer, and thereafter drying said solution.

* * * * *